(No Model.)

J. W. HAINES.
SECURING SHANKS TO GLASS KNOBS.

No. 314,828. Patented Mar. 31, 1885.

WITNESSES.
Joseph Ishbaugh.
B. W. Williams.

INVENTOR.
John W. Haines
By his Att'y
Henry W. Williams.

UNITED STATES PATENT OFFICE.

JOHN W. HAINES, OF CAMBRIDGE, MASSACHUSETTS.

SECURING SHANKS TO GLASS KNOBS.

SPECIFICATION forming part of Letters Patent No. 314,828, dated March 31, 1885.

Application filed July 11, 1884. (No model.)

*To all whom it may concern:*

Be it known that I, JOHN W. HAINES, of Cambridge, in the county of Middlesex and State of Massachusetts, have invented new and useful Improvements in Molds Used in Securing Shanks to Glass Knobs, of which the following is a specification.

The ordinary manner of attaching the metallic shanks to glass knobs consists in inserting the shank in a hole in the rear side of the knob and then making it rigid by the application of cement, lead, or other substance. The objection to this is that in time and by use the shanks become loosened and finally separated from the knobs, which are then useless.

In using the mold described below, the shank is pressed into the knob while in a liquid state in the mold, no foreign adhesive substance being employed, so that the shank cannot possibly become loose or separated from the knob without actually breaking the latter.

Figure 1:
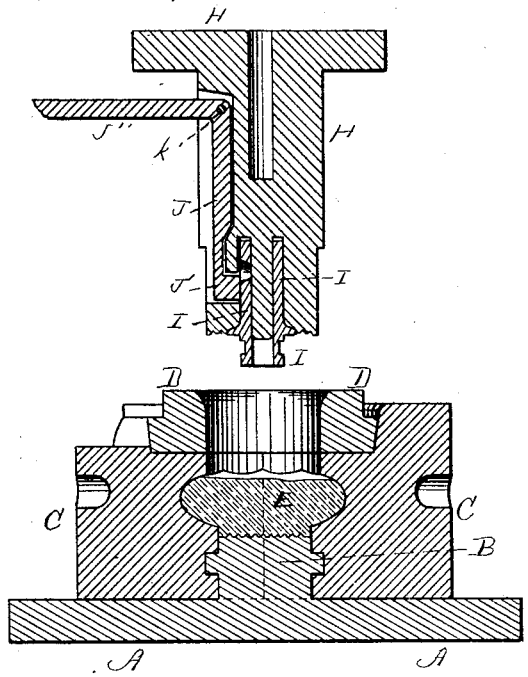
Figure 2:
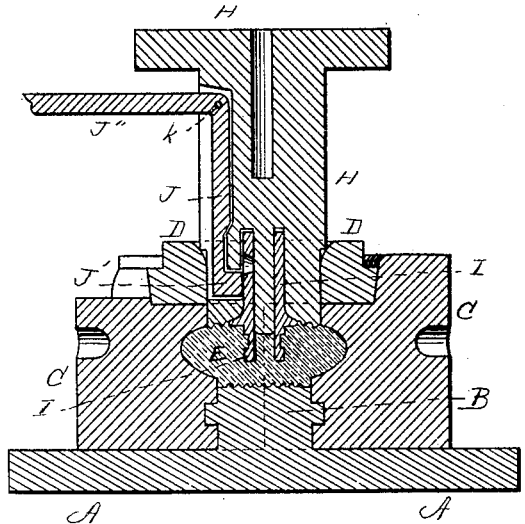
Figure 3:
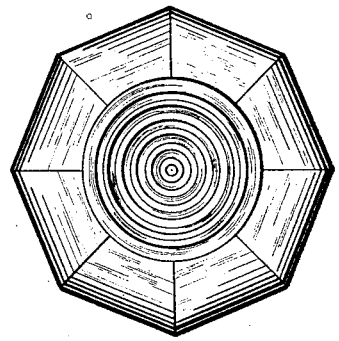

In the accompanying drawings, in which similar letters of reference indicate like parts, Figure 1 is a vertical section showing a mold for pressing glass into knobs, with the plunger (carrying the shank) in the act of descending for the purpose of pressing the shank into the glass to form the knob. Fig. 2 is a similar view showing the plunger down and the shank pressed into the glass. Fig. 3 is a front view, and Fig. 4 a sectional view, of the completed knob with the shank pressed into it.

A represents the bottom plate; B, the punty, (upon which is the design for the outer face of the knob;) C C, the jaws; and D, the ring or guide for the plunger to pass through, all constructed, substantially as usual, in molds for pressing glass.

E represents the melted glass in the mold.

Figure 4:
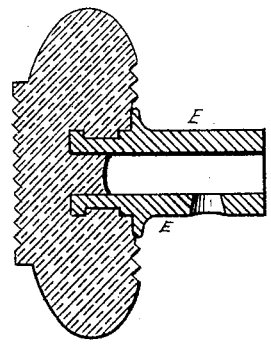

H is the plunger, adapted to be forced into the mold in the ordinary manner. This plunger is shaped to receive the shank I, as shown, and has pivoted to it, at k, an elbow-lever consisting of the horizontal arm J″ and the vertical arm J, provided with the horizontal projection J′. This projection J′ is held by gravity lightly against the shank I, producing friction enough to prevent it from dropping by its own weight out of the plunger, the shank being held therein by no other means. Now, when the plunger descends into the mold, the shank I is pressed into the glass E, as in Fig. 2, and being held there, say, four or five seconds, the glass cools enough to exercise sufficient hold on the shank to overcome the friction of the lever J and retain it. After the glass is cool enough, the knob is removed, and the glass and shank are, as shown in Fig. 4, secured together so as to be practically one.

It will be noticed that I press the shank into the glass (knob) instead of pressing the glass onto the shank. This is for various reasons, principal among which are that the pressure can be gaged better, so as to avoid cracking the knob, and in order to bring the punty, which contains the figure on the under side, so that if too much glass is cut the variation will appear on the back side of the knob, where it will not be noticed.

Having thus fully described my invention, what I claim, and desire to secure by Letters Patent, is—

In a mold for pressing shanks into glass knobs, the combination, with the plunger H, provided with openings for the reception of the shank I, of the lever J J′ J″, pivoted to said plunger and adapted to lie against said shank, substantially as and for the purpose described.

JOHN W. HAINES.

Witnesses:
HENRY W. WILLIAMS,
JOSEPH ISHBAUGH.